United States Patent Office 3,491,240
Patented Jan. 20, 1970

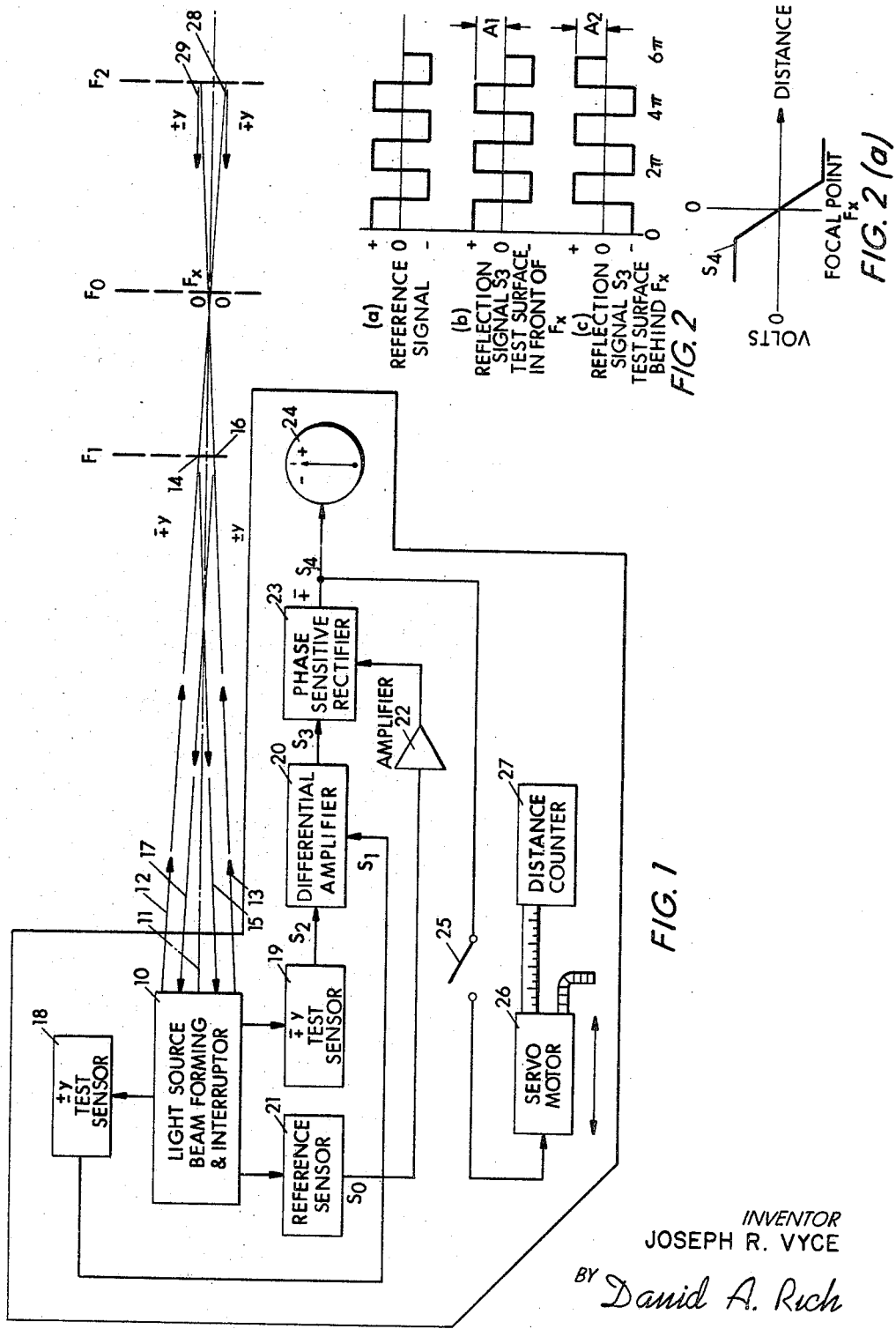

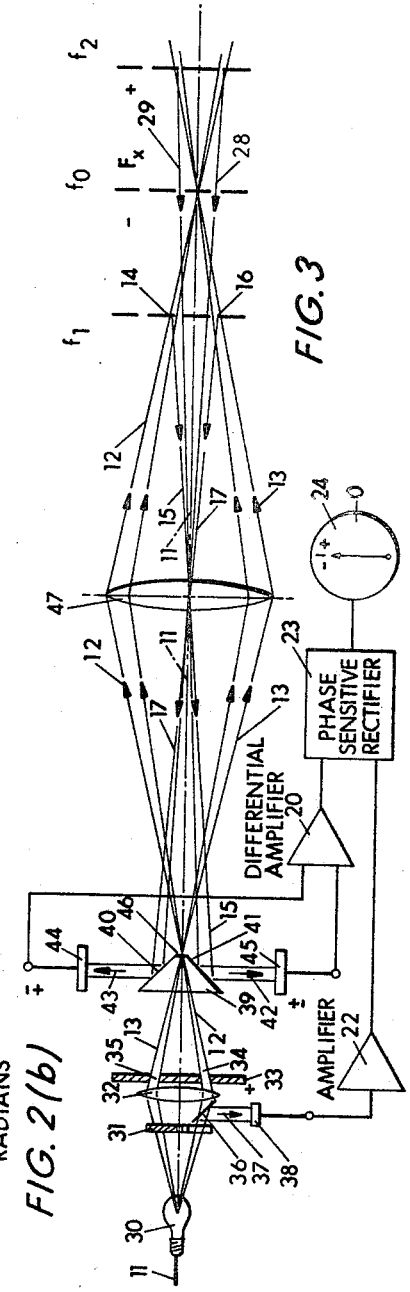
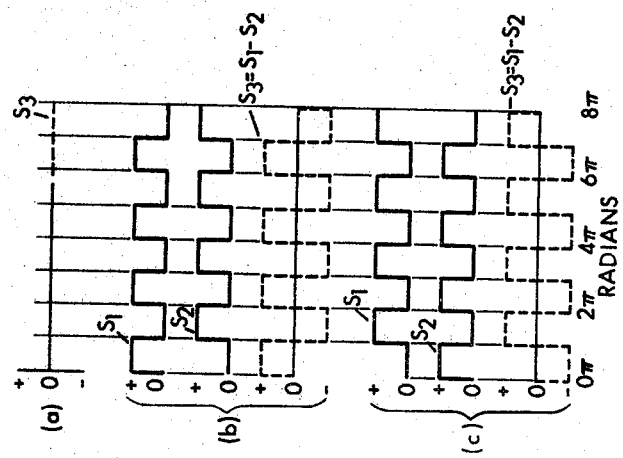

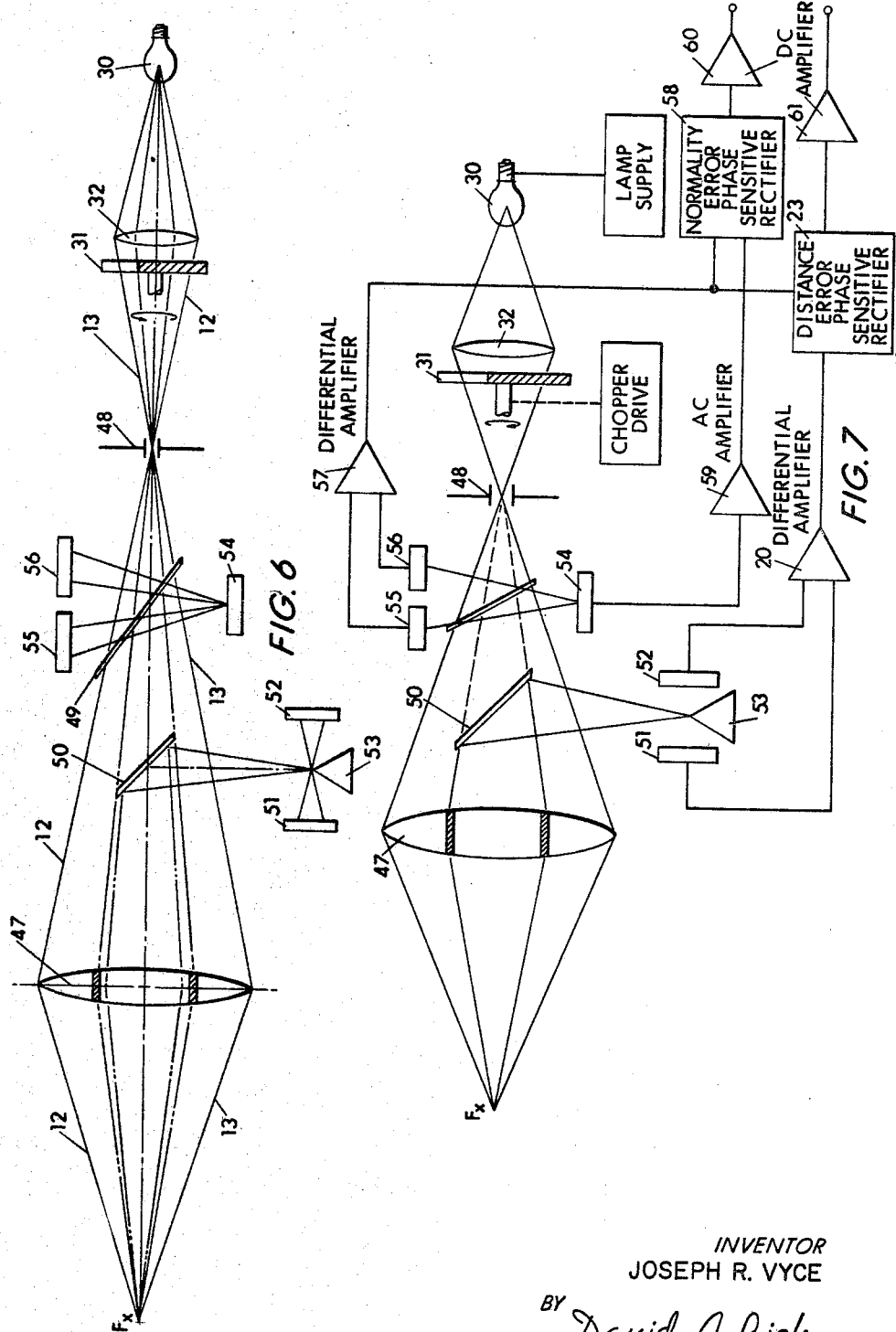

3,491,240
NONCONTACTING SURFACE SENSOR
Joseph R. Vyce, Lexington, Mass., assignor to Itek Corporation, Lexington, Mass., a corporation of Delaware
Filed Mar. 29, 1967, Ser. No. 626,789
Int. Cl. H01j 39/12; G01d 5/36
U.S. Cl. 250—209                                13 Claims

ABSTRACT OF THE DISCLOSURE

Optical measuring apparatus for measuring the distance between a reference plane and a diffuse test surface. A light source is divided into two beams and imaged on the test surface. The beams are alternately interrupted. A portion of the energy of one of the beams is used to provide a reference signal. The two beams converge at a focal point which either coincides with the test surface, is behind the test surface or is in front of the test surface. The two beams are reflected to a photoelectric differential circuit which produces a reflection signal varying in phase and amplitude in accordance with the distance of the focal point from the test surface. The reflection and reference signals are coupled to a phase comparator which produces an error signal indicative of the position of the test surface relative to the focal point.

---

The present invention relates to apparatus for the accurate measurement on a point by point basis of the distance from a reference plane to a surface. More particularly, the invention relates to optical apparatus for this type of measurement of diffusely reflecting surfaces.

Most known devices for this type of measurement typically employ a sensor or probe which contacts the surface, thus introducing errors caused by surface distortion from the force of the probe. This factor is especially important if errors of less than 0.01 inch must be considered. Thus for accurate measurement non-contacting devices must be used, especially if the surface to be measured is soft or delicate.

Prior art devices of this character include capacitive guages and spot interferometers. These, however, are limited to very small working distances. They cannot work at distances of more than a small fraction of an inch with very high sensitivity.

In the present invention an optical probe is utilized as part of an autoreflecting system for providing error signals indicative of the distance of a surface under test from a known reference point.

It is therefore an object of the invention to provide an improved optical measuring apparatus for measuring the distance from a reference plane to a surface.

A further object of the invention is to provide an improved optical measuring apparatus of the character described, without physically contacting the surface.

Yet another object of the invention is to provide an improved optical measuring apparatus useful for the measurement of diffuse surfaces.

Still another object of the invention is to provide an improved optical measuring apparatus of the character described having the capacity for deriving measurements of less than .0001 inch at a distance of greater than one inch.

Yet another object of the invention is to provide an improved optical measuring apparatus of the character described capable of providing a measure of normality of a test surface relative to an optical axis.

A still further object of the invention is to provide an improved optical measuring apparatus of the character described including servo means for maintaining the apparatus at a selected distance from a test surface to provide thereby an indication of the distance of the test surface from a predetermined reference.

Other and further objects of the invention will be apparent from the following description taken in connection with the accompanying drawings, and its scope will be pointed out in the appended claims.

In accordance with the invention there is provided a measuring apparatus. The apparatus includes beam forming means responsive to a radiant energy source means. A pair of energy beams are formed which converge at a focal point along a radiation axis related to the beam forming means. Modulation means are provided for modulating one of the beams relative to the other with respect to a selected characteristic, such as, for example, time, frequency or phase. Reference signal means provide a reference signal indicative of the modulated beam. Reflection signal means produce a reflection signal in response to the beams reflected from a test surface transverse the radiation axis. Comparator means produce an output signal in response to the reflection and reference signals indicative of the position of the test surface relative to the focal point.

In one form of the invention there is provided an optical measuring apparatus. The apparatus includes a light source means. Beam forming means are responsive to the light source. A pair of light beams are formed which converge at a focal point along an optical axis related to the beam forming means. Interruptor means are provided for alternately interrupting the beams at a predetermined rate. Reference signal means provide a reference signal indicative of one of the interrupted beams. Reflection signal means produce a reflection signal in response to the beams reflected from a test surface traversing the optical axis. Comparator means produce an output signal in response to the reference and reflection signals indicative of the position of the test surface relative to the focal point.

In another form of the invention the reference signal means include a pair of spaced reflecting surfaces so oriented relative to the optical axis as to reflect each reflected beam along opposite test axes normal to the optical axis. A pair of reflection signal photoelectric sensing means are disposed along the test axes responsive to each reflected beam. A differential amplifier is coupled to the reflection signal photoelectric sensing means for producing a reflection signal indicative of the algebraic sum of the reflected beams. The reference signal means include a reference signal photoelectric sensing means along a reference axis normal to the optical axis and responsive to one of the interrupted beams to provide an electrical reference signal. The comparator means include a phase-sensitive rectifier coupled to the differential amplifier and the reference signal photoelectric sensing means to provide the output signal varying in accordance with the amplitude of the reflection signals and the relative phase between the reference and reflection signals. Indicator means are coupled to the comparator means to provide an indication of the position of the test surface relative to the focal point.

In still another form of the invention servo means are provided for so-moving the apparatus relative to the test surface in response to the output signal as to tend to cancel out the output signal and position the focal point in the test surface. Indicator means are coupled to the servo means for providing an indication of the distance of a selected test surface area from a predetermined reference.

In the drawings:
FIGURE 1 is a schematic block diagram of an optical measuring apparatus embodying the invention;
FIGURES 2, 2(a) and 2(b) are graphs illustrating aspects of the operation of the apparatus in FIG. 1;
FIGURE 3 is a schematic diagram particularly illustrating an optical system useful in the embodiment in FIG. 1;

FIGURE 4 is a front view of an interrupting member shown in FIG. 3;

FIGURE 5 is a front view of a beam forming member shown in FIG. 3;

FIGURE 6 is a schematic diagram of a modification of the embodiment in FIG. 1; and FIGURE 7 is a schematic block diagram of the modification shown in FIG. 6.

Description and explanation of the apparatus in FIG. 1

While the apparatus has application for a wide range of radiation sources, the following description is taken by way of example with respect to an optical measuring system. The term "radiant energy" as used herein includes, but is not limited to, electromagnetic energy in all frequency ranges.

A light source such as a tungsten or xenon bulb provides optical energy for a beam forming and interrupting means. The beam forming device projects a pair of beams of light at an angle with respect to an optical axis convergent at a known focal point. A test surface traversing the optical axis reflects light which returns along or at an angle to the optical axis. A reference sensor is coupled to one of the interrupting beams and to a phase-sensitive rectifier. A pair of test sensors are responsive to the reflected light means and are coupled to a differential amplifier. The differential amplifier is coupled to the phase-sensitive rectifier. The phase-sensitive rectifier is coupled to an output indicator and through a switch to a servo motor. The servo motor is coupled for example to an optical bench and causes the apparatus to move back and forth with respect to a test surface. The motor is coupled to a counter which provides an indication of the distance of the test surface from a known reference point.

Thus, referring now to the drawings and with particular reference to FIG. 1, there is here illustrated a schematic block diagram of an optical measuring apparatus embodying the invention. The light source means, beam forming means and interrupting means are shown at 10. An optical axis 11 is shown relating to the beam forming means. The beam forming means 10 produce a chopped beam 12 and alternately chopped beam 13 which converge at a focal point $f_x$ indicative of the plane $f_0$. A test surface area in front of the local point $f_x$ lies in the plane indicated as $f_1$; behind the focal point $f_x$, it is indicated as in plane $f_2$. The beam 12 is reflected at a point 14 on the surface $f_1$ at a reflection angle corresponding with a reflected beam 15. The beam 13 is reflected at a point 16 from the surface at $f_1$ at a reflection angle corresponding with the reflected beam 17. A pair of test sensors 18 and 19 respond to the reflected beams 15 and 17, respectively. The sensors 18 and 19 are coupled to a differential amplifier 20. A reference sensor 21 is responsive to the interrupted beam 13 and provides a reference signal which is coupled through an amplifier 22 to a phase-sensitive rectifier 23. The output of the differential amplifier 20 is a composite reflection signal which is also coupled to the rectifier 23. The rectifier 23 produces an output signal indicative of the position of the test surface relative to the focal point $f_x$. The output signal varies in accordance with the amplitude of the reflected beams and a relative phase between the reference and reflection signals. The rectifier 23 is coupled to an indicator 24 such as a galvanometer or other visual indicator device. The output of the rectifier 23 is also coupled to a switch 25 which controls the application of the output signal from the rectifier 23 to a servo motor 26. The motor 26 is coupled to a distance counter 27 and to the optical bench to cause the apparatus to move in translational motion along the optical axis 11.

Reference signal $S_0$ from the sensor 21 is shown as amplified at the input of the rectifier as graph (a) of FIG. 2. The abscissa of the graph in FIG. 2 is in radians and the ordinate in signal amplitude. The graph (b) is indicative of the reflection signal $S_3$ corresponding with the output of the amplifier 20 when the test surface is in front of the focal point $f_x$. The graph (c) is indicative of the reflection signal $S_3$ when the test surface is behind the focal point $f_x$. The signal output from the rectifier 23, the output signal $S_4$, provides an error signal as shown in FIG. 2(a). The amplitude of the reflection signal decreases as the focal point $f_x$ approaches the test surface and increases as the focal point $f_x$ departs from the test surface. Thus, in FIGS. 2 and 2(a) the amplitudes $A_1$ and $A_2$ increase to positive saturation as the test surface distance from $f_x$ increases, and decreases to negative saturation as the distance from the test surface to $f_x$ decreases.

The signal $S_1$ from the sensor 18 and the signal $S_2$ from the sensor 19 are shown in FIG. 2(b) for various conditions. The curve (a) in FIG. 2(b) is indicative of the test surface at the focal point, the curve (b) of the test surface in front of the focal point $f_x$, and the curve (c) of the test surface behind the focal point $f_x$. The composite reflection signal $S_3$ is zero for the curve (a) and is shown in dotted lines for the curves (b) and (c).

The amplitude variations $A_1$ and $A_2$ as shown in FIGS. 2 and 2(a) correspond with the degree of overlap of the images provided by the beams 12 and 13 at the test surface. If the images precisely overlap, corresponding with the focal point $f_x$ at the test surface, substantially all of the energy is reflected back along the optical axis and does not provide any reflection signal energy to the test sensors 18 and 19. The reflection signal represents the difference signal $S_1$ minus $S_2$.

For the condition when the test surface is at the focal plane $f_2$, the reflected beam corresponding with the interrupted beam 12 is indicated at 28 and the reflected beam corresponding with the beam 13 is indicated at 29. For this condition, the reflected beam 28 is coupled to the test sensor 19. In contrast, when the test surface is in front of $f_x$, the reflected beam 15 corresponding with the interrupted beam 12 is coupled to the sensor 19 and the reflected beam 17 to the sensor 18. Thus, each reflected beam gives an independent indication of both the magnitude and sense of direction of the displacement of the test surface from the reference plane $f_0$. The utilization of both reflected beams together provides a more accurate and stable output.

For greater clarity, the apparatus as shown is restricted to translational motion along the optical axis. To provide measurements for an entire surface, the apparatus has three degrees of freedom for motion along each axis of an orthogonal set of three axes.

As described above, the apparatus is translated along the optical axis until the focal point $f_x$ coincides with the test surface area in the plane $f_1$ corresponding with a null condition of zero error signal. The distance of the apparatus from the focal point $f_x$ may be as great as 12 inches or greater, and as small as 1 inch or less.

Description and explanation of the optical system in FIG. 3

Referring now to FIG. 3, there is here illustrated in greater detail an optical system useful in the embodiment shown in FIG. 1. Components which correspond with those in FIG. 1 are referenced by identical reference numerals.

A light source 30 is interrupted by a rotating member 31 having alternate opaque and transparent areas. The rate of rotation of the member 31 about the optical axis 11 determines the chopping frequency of the beam 13. When the beam 13 is cut off as shown, the beam 12 is projected through a condensing lens 32 and beam forming member 33 having an opening 34. A front view of the member 31 is shown in FIG. 4 and a front view of the member 33 is shown in FIG. 5. The member 33 has an opening 35 for the beam 13. A beam splitting mirror 36 reflects a portion of the interrupted beam 12 along a reference axis 37, substantially normal to the optical axis 11, to a photoelectric sensor 38. The beam 12 is on when the beam 13 is off and vice versa. Consequently, the interrupted beams 12 and 13 are mutually 180° or π radians out of phase. The beams are transmitted through a truncated slit prism 39 having opaque reflecting surfaces 40 and 41 which reflect the reflected beams 15 and 17 along test axes 42 and 43 which are substantially normal to the optical axis 11. Note that the reflecting surfaces are spaced with respect to the optical axis so as to permit reflected energy along the optical axis to pass through the prism without further reflection. The axes 42 and 43 are opposite each other as shown. A reflection signal photoelectric sensor 44 is responsive to energy reflected by surface 40 and a photoelectric sensor 45 is responsive to energy reflected by the surface 41. The slit 46 of the truncated prism for one application is .01 inch wide. The slit width may vary from less than .001 to over .1 inch. The beams 12 and 13 are transmitted to a projection lens 47 which converges them at the focal point $f_x$. The sensors 44 and 45 are coupled to the differential amplifier 20 and the reference sensor 38 is coupled to the amplifier 22, as described above.

Description and explanation of the embodiment of FIGS. 6 and 7

Referring now to FIG. 6, there is here illustrated a schematic diagram of an optical system for a modification of the embodiment in FIG. 1. Here a normality error signal is introduced to provide an indication of the perpendicularity of the test surface relative to the optical axis. The method of obtaining the reflected beam energy to provide the reflection signal is different from that in FIG. 3. In place of the truncated prism in FIG. 3 a beam splitting mirror is introduced at an angle traversing the optical axis to reflect both reflected beams along a test axis substantially normal to the optical axis. A reflecting field divider, such as a wedge or pyramid prism, further reflects the reflected beams to the reflection signal sensors. In addition, a pair of reference sensors are used in place of the single sensor of FIG. 3. Again identical reference notation is employed for corresponding components.

Thus, light source 30 projects light through the condensing lens 32 and chopper 31 to form the beams 12 and 13 which converge at a pinhole 48. The beams 12 and 13 are again projecting at the lens 47 to the focal point $f_x$. A beam splitting mirror 50 reflects the reflected beams to reflecting surfaces of a field divider 53 to a pair of reflection signal photoelectric sensors 51 and 52. The beam splitter 49 reflects transmitted energy to a pair of reference sensors 55 and 56 from the beams 12 and 13, respectively, and reflected beam energy to a normality error sensor 54.

Normality sensing is obtained by comparing the total energy in each of the reflection beams independent of position of the image. If the surface is not normal to the optical axis, there is an energy difference between the two reflection beams which increases in amplitude as the difference increases and in phase in accordance with the direction of the normality error.

Referring now to FIG. 7, a schematic block diagram of the circuit associated with the optical system of FIG 6 is illustrated. Here the reference sensors are coupled to a differential amplifier which in turn is coupled to a normality error phase-sensitive rectifier. The normality error sensor is coupled to the rectifier to provide an output signal indicative of the normality error. The reflection signal sensors are coupled to the differential amplifier and phase-sensitive rectifier as described above. Thus, the reference sensors 55 and 56 are coupled to a differential amplifier 57 which provides an input for a normality error phase-sensitive rectifier 58. The normality error sensor 54 is coupled to an amplifier 59 to the rectifier 58. The output of the rectifier 58 is coupled to an amplifier 60 which provides in its output a normality error signal. The sensors 51 and 52 are coupled to the differential amplifier 20 and to the distance error phase-sensitive rectifier 23. An output of the differential amplifier 57 is also coupled to the rectifier 23. The output rectifier 23 is coupled through an amplifier 61 to provide a range error signal.

In the embodiments illustrated and described above, the reference signal may be indicative of one or both energy beams. The interruptor means may be included in the light source itself. Although a single light source is shown, two light sources may be used which may, for example, be alternately pulsed on and off. The reference signal may be derived, for example, from an electrical driving signal used to drive the interruptor means or, for example, from a modulating signal directly applied to the light source.

It will be apparent from the foregoing description that the optical measuring apparatus of the present invention has broad application to the field of precise measurement and control.

While there has hereinbefore been presented what are at present to be the preferred embodiments of the invention, it will be apparent to those of ordinary skill in the art that many modifications and changes may be made thereto without departing from the true spirit and scope of the invention.

It will be considered, therefore, that all those changes and modifications which fall fairly within the scope of the invention shall be part of the invention.

What is claimed is:

1. Measuring apparatus, comprising:
   beam forming means responsive to radiant energy source means and having a radiation axis for forming a pair of energy beams converging at a focal point along said radiation axis;
   modulation means for modulating one said beam relative to the other with respect to a selected characteristic;
   reference signal means for providing a reference signal indicative of said modulated beam;
   reflection signal means for producing a reflection signal in response to said beams reflected from a test surface transverse said radiation axis; and
   comparator means responsive to said reflection and reference signals to supply an output signal which varies according to both the magnitude and sense of direction of the displacement of the test surface from said focal point.

2. The measuring apparatus of claim 1, wherein:
   servo means are provided for so moving said apparatus relative to said test surface in response to said output signal as to tend to cancel out said output signal and position said focal point at said test surface; and
   indicator means are coupled to said servo means for providing an indication of the distance of a selected test surface area from a predetermined reference.

3. The measuring apparatus of claim 1, wherein:
   said apparatus is optical and further includes a light source means;
   said radiation axis is an optical axis;
   said beams are light beams;
   said modulation means include interruptor means for alternately interrupting said beams at a predetermined rate; and
   said reference signal is indicative of one said interrupted beam.

4. The optical measuring apparatus of claim 3, wherein:
   said reference signal means include sensing means intercepting a portion of the light energy from said one interrupted beam.

5. The optical measuring apparatus of claim 3, wherein:
   said reflection signal means include a pair of sensing means intercepting each said reflected beam.

6. The measuring apparatus of claim 1, wherein:
   normality sensing means responsive to said reflected beams are provided for producing a normality signal indicative of the angle of said test surface relative to said radiation axis.

7. The optical measuring apparatus of claim 3, wherein:
normality sensing means responsive to said reflected beams are provided for producing a normality signal indicative of the angle of said test surface relative to said optical axis.

8. An optical probe for measuring the distance of a test surface from the probe comprising:
(a) beam forming means responsive to a radiation source and having a radiation axis for forming at least one radiation beam which is aimed at a point along said radiation axis;
(b) positioning means for positioning said optical probe relative to the test surface so that the test surface is located along said radiation axis;
(c) receiving means, including radiation sensing means and circuitry for analyzing the output of said radiation sensing means, for receiving each radiation beam reflected from the test surface and yielding an output signal which varies according to both the magnitude and sense of direction of the displacement of the test surface from said point along said radiation axis; and
(d) said optical probe incorporating normality sensing means which senses any deviation of the optical probe from a position normal to the test surface.

9. An optical probe for measuring the distance of a test surface from the probe comprising:
(a) beam forming means responsive to a radiation source and having a radiation axis for forming at least one radiation beam which is aimed at a point along said radiation axis;
(b) positioning means for positioning said optical probe relative to the test surface so that the test surface is located along said radiation axis;
(c) receiving means, including radiation sensing means and circuitry for anlyzing the output of said radiation sensing means, for receiving each radiation beam reflected from the test surface and yielding an output signal which varies according to both the magnitude and sense of direction of the displacement of the test surface from said point along said radiation axis; and
(d) said radiation sensing means including two radiation sensors, one being disposed on each side of said radiation axis, and each selectively receiving each reflected beam whenever the test surface is located at a distance away from said point.

10. Apparatus as set forth in claim 9 wherein said circuitry detects the distance of the test surface from said point by sensing the amplitude of the output of said radiation sensors, and detects the direction of the test surface relative to said point by sensing which of said radiation sensors detects each beam.

11. Apparatus as set forth in claim 9 wherein a truncated prism is located along said radiation axis and is so disposed that the sides of said prism act to direct said reflected beams to said two radiation sensors.

12. Apparatus as set forth in claim 11 wherein said beam forming means includes:
(a) condensing lens means to refractively condense the radiant energy from the radiant energy source;
(b) chopping means to modulate the radiation output of said condensing lens means;
(c) said truncated prism receives the radiation output of said chopping means and the radiant energy passes through the prism and out the side formed by the truncation of said prism; and
(d) a projection lens means located along said radiation axis to project the radiant energy from said prism toward said point, whereby radiant energy from the radiant energy source is passed through said condensing lens means to said chopping means where it is modulated and subsequently passed through said truncated prism and out the side formed by the truncation of said prism to said projection lens means, whereupon said projection lens means projects the radiant energy toward said point, and the reflected radiant energy from the test surface is reflected back through said projection lens means and toward said truncated prism.

13. An optical probe for measuring the distance of a test surface from the probe comprising:
(a) beam forming means responsive to a radiation source and having a radiation axis for forming two light beams which converge at a point along said radiation axis, said beam forming beams having a focal point at said point;
(b) positioning means for positioning said optical probe relative to the test surface so that the test surface is located along said radiation axis; and
(c) receiving means, including radiation sensing means and circuitry for analyzing the output of said radiation sensing means, for receiving each radiation beam reflected from the test surface and yielding an output signal which varies according to both the magnitude and sense of direction of the displacement of the test surface from said point along said radiation axis.

References Cited

UNITED STATES PATENTS

| | | | |
|---|---|---|---|
| 3,002,419 | 10/1961 | Vyce | 250—203 X |
| 3,355,590 | 11/1967 | Betram | 250—202 |
| 3,146,446 | 8/1964 | Novitzky | 250—220 X |
| 3,333,105 | 7/1967 | Kossakowski et al. | 88—14 X |
| 3,364,359 | 1/1968 | Cronin | 250—237 X |

JAMES W. LAWRENCE, Primary Examiner

E. R. LAROCHE, Assistant Examiner

U.S. Cl. X.R.

250—233, 237; 356—4, 172